F. J. SCHROEDER.
ONION TOPPING MACHINE.
APPLICATION FILED OCT. 21, 1920.

1,379,049.

Patented May 24, 1921.
2 SHEETS—SHEET 1.

INVENTOR.
Frank J. Schroeder
BY
ATTORNEY

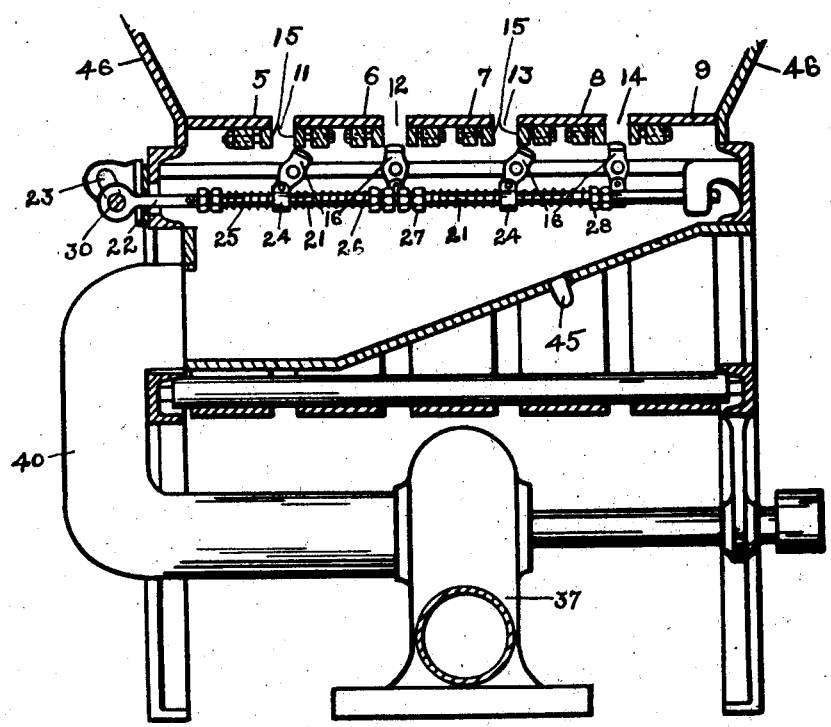
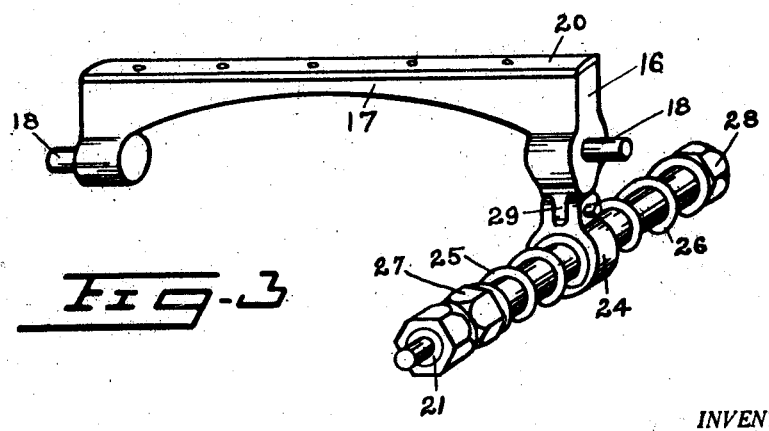

UNITED STATES PATENT OFFICE.

FRANK J. SCHROEDER, OF ROCHESTER, NEW YORK.

ONION-TOPPING MACHINE.

1,379,049.

Specification of Letters Patent.   Patented May 24, 1921.

Application filed October 21, 1920. Serial No. 418,558.

*To all whom it may concern:*

Be it known that I, FRANK J. SCHROEDER, a citizen of the United States, residing at Rochester, in the county of Monroe and State of New York, have invented certain new and useful Improvements in Onion-Topping Machines, of which the following is a specification.

The object of this invention is to provide a new and improved form of machine for topping onions.

This and other objects of this invention will be fully illustrated in the drawings, described in the specification and pointed out in the claims at the end thereof.

In the accompanying drawings:

Fig. 2 is a transverse, vertical sectional view of the onion topper.

Fig. 3 is a detail perspective view of one of the cutting bars of the onion topper.

In the several figures of the drawings, like reference numerals indicate like parts.

Figure 1:
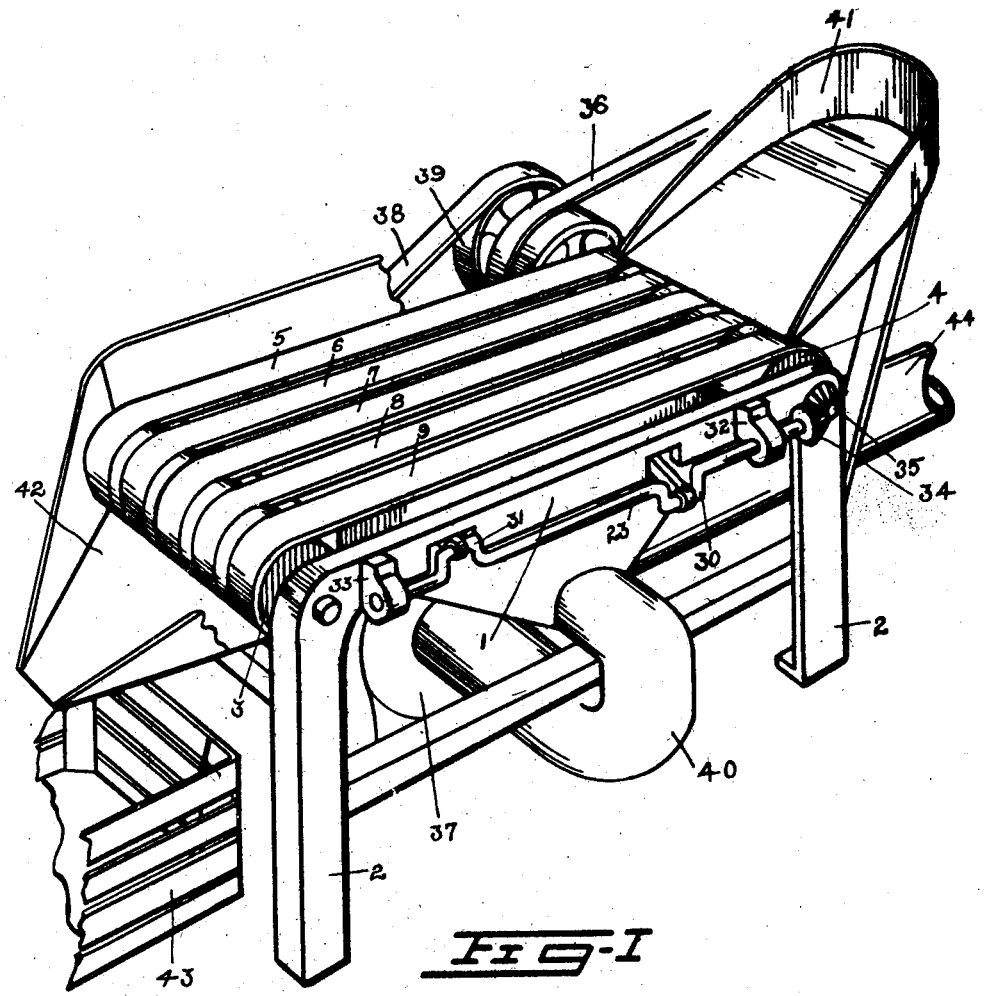
Figure 1 is a perspective view of the onion topper.

In the drawings, reference numeral 1 indicates the frame of the machine which is supported on suitable uprights or legs 2. At each end of this frame is mounted to rotate an elongated pulley 3 and 4, over which a series of belts 5, 6, 7, 8 and 9 are adapted to travel. These belts travel over a casing 10, mounted in the frame 1, which is provided with the slots 11, 12, 13 and 14. These slots are located adjacent to the belts 5, 6, 7, 8 and 9, and separate the belts from one another. At each side of each of the slots 11, 12, 13 and 14 on the inside thereof is mounted a stationary cutting bar 15 which coöperates with the rocking cutting bars 16 mounted on the inside of the casing 10 below the slots. The cutting bars 16 are preferably made up of a cast iron bridge 17, on each end of which is provided a pivot pin 18 for the cutting bar 17 to rock on. The pivot pins 18 are mounted in suitable bearings on the inside of the casing at either end thereof. To the top of the bridge 17 is fastened the cutting edge 20 which is slightly convex at the top to conform to the arc described by the cutting bar in rocking back and forth below the slot in the casing and between the stationary cutting bars 15.

The cutting bars 16 are operated by the connecting links 21 which connect every alternate bar together and to the connecting rod 22, operated by the crank shaft 23.

The cutting bars are yieldingly fastened to the connecting links by means of a collar 24 which is held in a predetermined position on the link by the expansion springs 25 and 26, one on each side of the collar 24 and spaced between the adjustable nuts 27 and 28. By adjusting the tension of the springs 25 and 26 by means of the nuts 27 and 28, the collar 24 may be held in a proper position on the connecting link and hold the cutting bar 16 in its proper cutting position with relation to the stationary cutting bars 15.

The top of the collar 24 is bifurcated to receive the tongue 29 provided on the lower end of the bridge 17. The bridge and collar are thus connected together and on the reciprocation of the connecting links 21 by the crank shaft 23 operate to rock the cutting bar back and forth below one of the slots and between the stationary cutting bars 15.

In order to give every alternate cutting bar a different angular setting so that the cutting operation of half of the knives occurs at different intervals in order to make part of the cutting bars cover the slots below which they operate, while the other cutting bars uncover their slots, half of the cutting bars are operated from the crank 30 and the other half are operated from the crank 31 of the crank shaft 23. In this way, every alternate cutting bar is driven at one end of the machine while the other cutting bars are operated from the other end of the machine.

The crank shaft 23 is mounted in suitable bearings 32 and 33 on the outside of the frame 1 and carries at one end thereof the bevel pinion 34, which is adapted to mesh with the bevel pinion 35 keyed to the shaft carrying the elongated pulley 4. The pulley 4 is driven by any suitable motive power through the belt 36.

Mounted below the casing 10 is the exhaust fan 37. This fan is driven by the belt 38 from the pulley 39 keyed on the shaft carrying the elongated pulley 4. The intake of the fan 37 is connected with the exhaust opening of the casing through the pipe 40 and on the operation of the fan, the air in the casing is exhausted and a partial vacuum is created therein.

In operation the onions are dumped into the hopper 41 at the head of the machine, from which they slide onto the belts 5, 6, 7, 8 and 9. As these belts revolve they drag the onions with them over the top of the machine. On their travel over the machine the partial vacuum created on the inside of the casing 1 operates to draw the tops of the onions into the slots between the belts. The tops thus drawn into the casing are then clipped off by the knives on the reciprocation thereof. The onions with the tops clipped off are then carried by the belts to the other end of the machine where they drop through the chute 42 into the crate 43.

The tops clipped off by the knives are drawn through the exhaust fan and forced out through the exhaust end thereof into a conveyer pipe 44 which is adapted to deposit the tops in a stack at any convenient point at a distance from the location of the onion topping machine.

As heretofore pointed out, half of the cutting bars cover the slots below which they operate, while the other half has uncovered their slots and is in a position for slipping the tops that are pulled through the slots by the vacuum created in the casing. In this way, a greater vacuum can be maintained in the casing which insures the pulling of the tops into the slots in the casing. Should all of the slots or part of them get clogged up by the tops of the onions, the relief valve 45 provided on the casing, operates to admit air into the casing. This insures an even vacuum pressure in the casing so that the tops of the onions are pulled into the slots with a uniform pull at all times.

On each side of the frame 1 is provided a side board 46 between which the belts travel. These side boards prevent the onions from dropping off from the belts at the sides of the machine while being conveyed from one end of the machine to the other end thereof.

I claim:

1. In an onion topping machine, the combination of a casing having longitudinal slots therein, means for creating a partial vacuum in said casing, means for conveying onions on either side of the slots in said casing and parallel thereto, and means for clipping off the tops of the onions pulled into the slots of the casing by the partial vacuum created in said casing.

2. In an onion topping machine, the combination of a frame, a pulley mounted at each end of said frame, endless conveyer belts traveling over said pulleys, said belts being spaced apart from each other, means to draw the tops of onions conveyed by said belts between said belts, and means to clip off the tops of the onions between said belts.

3. In an onion topping machine, the combination of a frame, a casing mounted in said frame, a pulley mounted at each end of said casing, said casing having slots cut into the top thereof, endless belts traveling over said casing between said pulleys and on each side of the slots provided therein, knives mounted to rock in said casing below the slots in said casing, and means to create a partial vacuum in said casing.

4. In an onion topping machine, the combination of a frame, a casing having slots in the top thereof mounted in said frame, endless belts traveling over said casing adjacent to the slots in the casing, knives mounted to rock in said casing below the slots, connecting links connecting said knives, a crank, and a connecting rod connecting said connecting links with said crank.

5. In an onion topping machine, the combination of a frame, a casing having slots in the top thereof mounted in said frame, endless belts traveling over said casing adjacent to the slots therein, an exhaust fan connected to said casing to create a partial vacuum in said casing, cutting knives mounted to reciprocate below the slots in said casing, and means operating said cutting knives.

6. In an onion topping machine, the combination of a frame, a casing having slots in the top thereof mounted in said frame, endless belts traveling over said casing adjacent to the slots provided therein, cutting bars mounted to rock below the slots in said casing, connecting links for operating said cutting knives, yielding means for connecting said knives to said connecting links, a crank for operating said connecting links and means to adjust the connection between said cutting knives and said connecting links to make said cutting knives operate in different angular positions.

7. In an onion topping machine, the combination of a series of cutting bars, a lever provided for each of said cutting bars, a sleeve connected to said lever, a connecting link passing through said sleeve, a spring on each side of said sleeve surrounding said connecting link, said springs being adapted to hold said sleeve on said connecting link yieldingly in a predetermined position thereon.

8. In an onion topping machine, the combination of a casing having longitudinal slots therein, a stationary cutting edge on each side of the slots in said casing and below them, a movable cutting bar below the slots in said casing, said cutting bar being adapted to pass said stationary cutting edges on the reciprocation thereof, conveyer belts on either side of the slots of said casing, and means to draw the tops of the onions between said cutting edges.

In testimony whereof I affix my signature.

FRANK J. SCHROEDER.